United States Patent
Osawa

(10) Patent No.: US 12,480,975 B2
(45) Date of Patent: Nov. 25, 2025

(54) CURRENT DETECTION DEVICE

(71) Applicant: KOA CORPORATION, Ina (JP)

(72) Inventor: Ryou Osawa, Ina (JP)

(73) Assignee: KOA CORPORATION, Ina (JP)

( * ) Notice: Subject to any disclaimer, the term of this patent is extended or adjusted under 35 U.S.C. 154(b) by 142 days.

(21) Appl. No.: 18/559,922

(22) PCT Filed: Apr. 22, 2022

(86) PCT No.: PCT/JP2022/018552
§ 371 (c)(1),
(2) Date: Nov. 9, 2023

(87) PCT Pub. No.: WO2022/244595
PCT Pub. Date: Nov. 24, 2022

(65) Prior Publication Data
US 2024/0248119 A1 Jul. 25, 2024

(30) Foreign Application Priority Data
May 18, 2021 (JP) .................................. 2021-083739

(51) Int. Cl.
*G01R 1/20* (2006.01)
*G01R 19/00* (2006.01)

(52) U.S. Cl.
CPC ......... *G01R 1/203* (2013.01); *G01R 19/0092* (2013.01)

(58) Field of Classification Search
CPC .. G01R 1/203; G01R 19/0092; G01R 15/146; H01C 13/00; H01C 1/14
USPC ....................................................... 324/126
See application file for complete search history.

(56) References Cited

U.S. PATENT DOCUMENTS

| 2013/0181807 A1* | 7/2013 | Hetzler | ..................... H01C 7/06 |
| | | | 338/7 |
| 2017/0212150 A1 | 7/2017 | Kang et al. | |
| 2018/0172735 A1* | 6/2018 | Arai | ........................ G01R 15/00 |

FOREIGN PATENT DOCUMENTS

| CN | 201429643 Y | * | 3/2010 | | |
| DE | 202021103627 U1 | * | 7/2021 | .............. | H01C 1/14 |
| EP | 1492130 B1 | * | 10/2006 | ............. | G01R 1/203 |
| JP | 2009-250731 A | | 10/2009 | | |
| JP | 2014-90205 A | | 5/2014 | | |
| JP | 2016-537637 A | | 12/2016 | | |
| JP | 2020-27847 A | | 2/2020 | | |
| JP | 2020-145365 A | | 9/2020 | | |

(Continued)

OTHER PUBLICATIONS

International Search Report dated Jul. 19, 2022, issued in counterpart International Application No. PCT/JP2022/018552, with English Translation. (4 pages).

*Primary Examiner* — Judy Nguyen
*Assistant Examiner* — Robert P Alejnikov, Jr.
(74) *Attorney, Agent, or Firm* — WHDA, LLP

(57) ABSTRACT

The present invention relates to a current detection device, in particular a current detection device using a shunt resistor. The current detection device (30) includes a resistive element (5) and a pair of electrodes (6, 7). The electrodes (6, 7) have detection areas (24a, 25a) demarcated by first slits (16, 17), second slits (26, 27), and contact surfaces (6a, 7a) that at least partially contacts the resistive element (5). The electrodes (6, 7) further have voltage detection portions (20, 21) arranged in the detection areas (24a, 25a).

7 Claims, 7 Drawing Sheets

(56) References Cited

FOREIGN PATENT DOCUMENTS

| JP | 2022-27164 A | | 2/2022 |
|----|--------------|---|--------|
| JP | 2022027164 A | * | 2/2022 |

* cited by examiner

CURRENT DETECTION DEVICE

TECHNICAL FIELD

The present invention relates to a current detection device, especially a current detection device using a shunt resistor.

BACKGROUND ART

A shunt resistor is widely used in a current detection application. Such shunt resistor has a resistive element and electrodes bonded to both ends of the resistive element. Generally, the resistive element is made of a resistive alloy such as a copper-nickel alloy, copper-manganese alloy, iron-chromium alloy, or nickel-chromium alloy, while the electrodes are made of a highly conductive metal such as copper. The electrode has a voltage detection portion, and a voltage generated at the both ends of the resistive element is detected by connecting a conductor (e.g., aluminum wire) to the voltage detection portion.

CITATION LIST

Patent Literature

Patent document 1: Japanese laid-open patent publication No. 2014-90205

SUMMARY OF INVENTION

Technical Problem

In the shunt resistor, a temperature coefficient of resistance (TCR) characteristic is important to enable the current detection under a condition where an effect of temperature fluctuation is small. The temperature coefficient of resistance is an index that indicates a rate of change of a resistance value with temperature. Therefore, the present invention provides a current detection device using a shunt resistor with a simple structure that can reduce the temperature coefficient of resistance.

Solution to Problem

In an embodiment, there is provided a current detection device used for current detecting, comprising: a resistive element; and a pair of electrodes connected to both ends of the resistive element, the current detection device has a pair of first slits and a pair of second slits connected to the pair of the first slits, each of the first slits is formed to hang over each of the electrodes and the resistive element along a first direction, which is an arrangement direction of the pair of the electrodes, each of the second slits is formed on each of the electrodes along a second direction, which is a direction perpendicular to the first direction, each of the electrodes has a detection area demarcated by each of the first slits, each of the second slits, and a contact surface that at least partially contacts the resistive element, and each of the electrodes further has a voltage detection portion arranged in the detection area.

In an embodiment, the voltage detection portion is arranged closer to the resistive element than a center of the detection area.

In an embodiment, the detection area protrudes from the resistive element in a thickness direction of the current detection device.

In an embodiment, the voltage detection portion is arranged adjacent to the contact surface and each of the first slits.

In an embodiment, the current detection device further comprises a wiring board, and the wiring board comprises a detection member connected to the voltage detection portion.

In an embodiment, the pair of the first slits is connected.

Advantageous Effects of Invention

The temperature coefficient of resistance can be reduced by arranging the voltage detection portion in the detection area demarcated by the first slit, the second slit, and a contact surface that at least partially contacts the resistive element.

DESCRIPTION OF EMBODIMENTS

Figure 1:
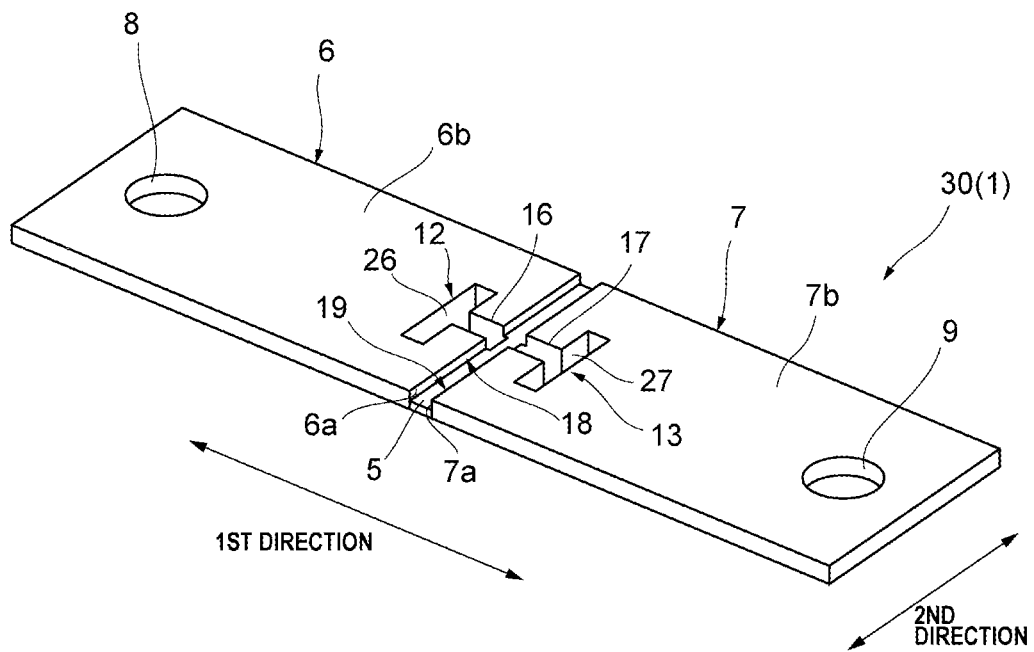
FIG. 1 is a perspective view showing an embodiment of a current detection device as a shunt type current detection device.

Embodiments of the present invention will be described below with reference to the drawings. In the drawings described below, identical or equivalent components will be marked with identical symbols and redundant explanations will be omitted. In the embodiments described below, a configuration of one embodiment not specifically described is the same as that of the other embodiments, and its duplicate description is omitted.

Figure 2:
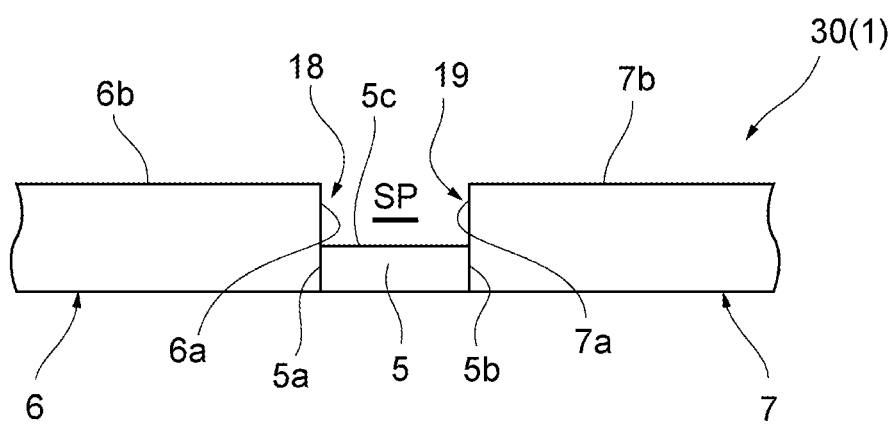
FIG. 2 is a side view showing the current detection device shown in FIG. 1.

FIG. 1 is a perspective view showing an embodiment of a current detection device 30 as a shunt type current detection device, and FIG. 2 is a side view showing the current detection device 30 shown in FIG. 1. In FIG. 2, a portion of the current detection device 30 is omitted. In this embodiment, the current detection device 30 includes a shunt resistor 1. In other words, the current detection device 30 in this embodiment is the shunt resistor 1 itself. As shown in FIGS. 1 and 2, the shunt resistor 1 includes a resistive element 5 made of a resistive alloy plate material having a predetermined thickness and width, and a pair of electrodes 6, 7 made of a highly conductive metal connected to both ends (i.e., both side connection surfaces) 5a, 5b of the resistive element 5 in a first direction. The electrode 6 has a contact surface 6a that at least partially contacts one end (one connecting surface) 5a of the resistive element 5, and the electrode 7 has a contact surface 7a that at least partially contacts the other end (other connecting surface) 5b of the resistive element 5. The electrodes 6, 7 have fastening holes 8, 9, respectively, for fixing the shunt resistor 1 with screws or the like.

The first direction above is a length direction of the current detection device 30, i.e., the length direction of the shunt resistor 1, and a direction of which the electrode 6, the resistive element 5, and the electrode 7 are arranged in this order. In other words, the first direction is a direction in which the current flows. A direction perpendicular to this first direction is a second direction. The second direction is a width direction of the current detection device 30, i.e., a width direction of the shunt resistor 1. As shown in FIGS. 1 and 2, the electrodes 6, 7 have the same structure, and are symmetrically arranged with respect to the resistive element 5.

Each of the both ends 5a, 5b of the resistive element 5 is connected (joined) to each of the electrodes 6, 7 by means of welding (e.g., electron beam welding, laser beam welding, or brazing). An example of the material of the resistive element 5 includes a low resistance alloy material such as a Cu—Mn alloy or a Ni—Cr alloy. An example of the material of electrodes 6, 7 can include copper (Cu). Cu—Mn alloys and Ni—Cr alloys have higher resistivity than copper.

As shown in FIGS. 1 and 2, a thickness of each of the electrodes 6, 7 is thicker than the thickness of the resistive element 5 in this embodiment. As shown in FIG. 2, back surfaces of the electrodes 6, 7 and a back surface of the resistive element 5 are on the same plane. Surfaces 6b, 7b of the electrodes 6, 7 are higher than a surface 5c of the resistive element 5 in a thickness direction of the current detection device 30 (shunt resistor 1). The thickness direction of the current detection device 30 (shunt resistor 1) is perpendicular to both the first and second directions. A step 18 is formed by the surface 6b of the electrode 6, the contact surface 6a, and the surface 5c of the resistive element 5, and a step 19 is formed by the surface 7b of the electrode 7, the contact surface 7a, and the surface 5c of the resistive element 5. A space SP is formed by the steps 18, 19 and the surface 5c.

As shown in FIG. 1, the shunt resistor 1 of the current detection device 30 has a pair of slits 12, 13. The slit 12 includes a first slit 16 and a second slit 26, and the slit 13 includes a first slit 17 and a second slit 27. In other words, a pair of first slits 16, 17 and a pair of second slits 26, 27 are formed in the shunt resistor 1 of the current detection device 30.

Figure 3:
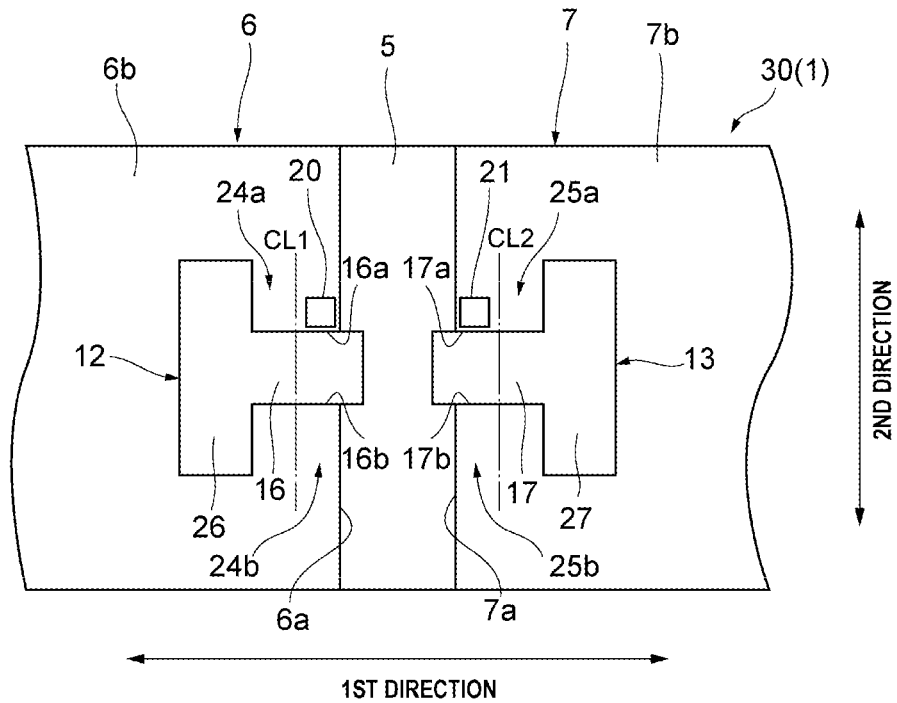
FIG. 3 is a partially enlarged view showing a shunt resistor, and a top view of the shunt resister.

FIG. 3 is a partially enlarged view showing the shunt resistor 1, and a top view of the shunt resister 1. As shown in FIG. 3, the first slit 16 is formed to hang over the electrode 6 and the resistive element 5 along the first direction, and the second slit 26 is formed on the electrode 6 along the second direction. The first slit 17 is formed to hang over the electrode 7 and the resistive element 5 along the first direction, and the second slit 27 is formed on the electrode 7 along the second direction. Specifically, the first slit 16 is formed from the electrode 6 to a portion of the resistive element 5 along the first direction, and the first slit 17 is formed from the electrode 7 to a portion of the resistive element 5 along the first direction.

The second slits 26, 27 are connected to the first slits 16, 17, respectively. Specifically, one end of the first slits 16, 17 is connected to a center of the second slits 26, 27, respectively. The slits 12, 13 penetrate in the thickness direction of the shunt resistor 1, and have a convex shape toward the resistive element 5 when the shunt resistor 1 is viewed from above.

As shown in FIG. 3, detection areas 24a, 24b are demarcated on the electrode 6 by the first slit 16, the second slit 26, and the contact surface 6a, and detection areas 25a, 25b are demarcated on the electrode 7 by the first slit 17, the second slit 27, and the contact surface 7a. The detection areas 24a, 24b are formed on the surface 6b of the electrode 6, and the detection areas 25a, 25b are formed on the surface 7b of the electrode 7. The detection areas 24a, 24b, 25a, and 25b protrude from the resistive element 5 in the thickness direction (thickness direction of the shunt resistor 1) of the current detection device 30.

As shown in FIG. 3, the electrodes 6, 7 have voltage detection portions 20, 21, respectively, for measuring the voltage (voltage of the resistive element 5) generated at the both ends 5a, 5b of the resistive element 5. The voltage detection portion 20 is arranged on the detection area 24a, and the voltage detection portion 21 is arranged on the detection area 25a. In one embodiment, the voltage detection portions 20, 21 may be arranged on the detection areas 24b, 25b, respectively.

The current flows through the shunt resistor 1 avoiding the slits 12, 13. Therefore, a potential distribution is less likely to occur in the detection areas 24a, 24b, 25a, and 25b. Therefore, by arranging the voltage detection portions 20, 21 in the detection areas 24a, 25a (or detection areas 24b, 25b), the temperature coefficient of resistance of the shunt resistor 1 can be reduced. In other words, by taking out the voltage from the voltage detection portions 20, 21 arranged in the detection areas 24a, 25a (or detection areas 24b, 25b), a voltage measurement with a small temperature coefficient of resistance can be performed, and stable current detection can be performed.

If the first slits 16, 17 are formed only on the electrodes 6, 7 with a gap between them and the resistive element 5, the current would be concentrated in the gap between the first slits 16, 17 and the resistive element 5, and the potential distribution would be large in the area near the first slits 16, 17 and the resistive element 5. Therefore, it will not be possible to create an area where the potential distribution is less likely to occur as in this embodiment. If the slits 12, 13 are formed at a location away from the resistive element 5 to avoid such current concentration, the detection area would be far away from the resistive element 5, and would be affected by temperature characteristics of the resistance of the materials (electrode materials) of the electrodes 6, 7 when measuring the voltage. In order to measure the voltage of the resistive element 5 with less influence of the temperature characteristics of the electrode material, it is desirable to take out the voltage from a position closer to the resistive element 5.

On the other hand, in this embodiment, the first slit 16 is formed to hang over the electrode 6 and the resistive element 5, and the first slit 17 is formed to hang over the electrode 7 and the resistive element 5. This avoids the concentration of the current described above and eliminates areas of large potential distribution. In addition, since the position close to the resistive element 5 can be used as a voltage detection position (positions of the voltage detection portions 20, 21), the voltage measurement can be performed with less influence of the temperature characteristics of the electrode material. As a result, the temperature coefficient of resistance of the shunt resistor 1 can be reduced.

Since an edge portion is formed by the first slits 16, 17 and the contact surfaces 6a, 7a, the voltage detection positions (positions of the voltage detection portions 20, 21) can be aligned based on the edge portion. It is possible to reduce voltage measurement errors due to the voltage detection positions, and to identify the voltage detection positions with good temperature characteristics, enabling stable voltage measurement. In addition, the temperature characteristics can be corrected for material characteristics and manufacturing variations by controlling the voltage detection positions (positions of the voltage detection portions 20, 21).

In this embodiment, the slits 12, 13 have a convex shape, but in one embodiment, the corners of the slits 12, 13 may have a R surface or a C surface.

In this embodiment, the voltage detection portions 20, 21 are arranged closer to the resistive element 5 than the centers of the detection areas 24a, 25a (center lines CL1, CL2) in the first direction. In one embodiment, the voltage detection portions 20, 21 may be arranged closer to the resistive element 5 than the centers of the detection areas 24b, 25b (center lines CL1, CL2) in the first direction. The influence of temperature characteristics on the resistance value of the electrode material can be further reduced, and the voltage of the resistor 5 can be measured with higher accuracy.

More specifically, the voltage detection portion 20 is arranged adjacent to the contact surface 6a and a side wall 16a of the first slit 16, and the voltage detection portion 21 is arranged adjacent to the contact surface 7a and a side wall 17a of the first slit 17. In one embodiment, the voltage detection portion 20 may be arranged adjacent to the contact surface 6a and the side wall 16b of the first slit 16, and the voltage detection portion 21 may be arranged adjacent to the contact surface 7a and the side wall 17b of the first slit 17. The influence of the temperature characteristic of the resistance of the electrode material can be further reduced, and the voltage of the resistive element 5 can be measured more accurately.

Figure 4:
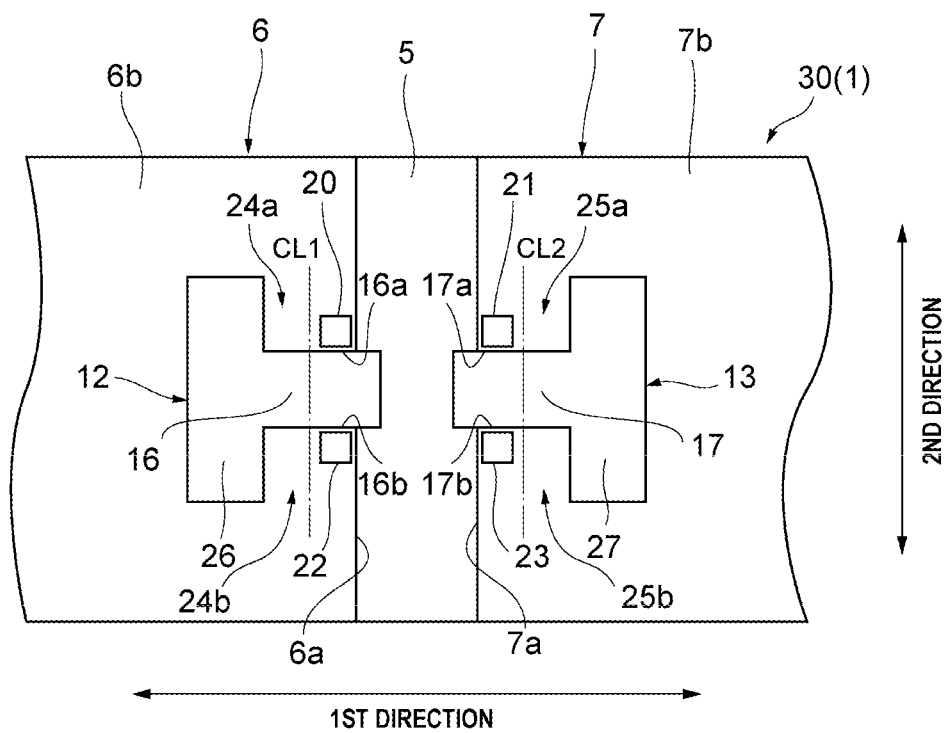
FIG. 4 is a schematic view showing another embodiment of the current detection device.

In one further embodiment, as shown in FIG. 4, the electrodes 6, 7 may further have voltage detection portions 22, 23 for measuring the voltage of the resistive element 5. The voltage detection portion 22 is arranged on the detection area 24b, and the voltage detection portion 23 is arranged on the detection area 25b. Specifically, the voltage detection portions 22, 23 are arranged closer to the resistive element 5 than the centers of the detection areas 24b, 25b (center lines CL1 and CL2) in the first direction. More specifically, the voltage detection portion 22 is arranged adjacent to the contact surface 6a and the side wall 16b of the first slit 16, and the voltage detection portion 23 is arranged adjacent to the contact surface 7a and the side wall 17b of the first slit 17.

The voltage detection portion 20 and the voltage detection portion 22 are at the same potential, and the voltage detection portion 21 and the voltage detection portion 23 are at the same potential. By taking out the voltage from the two pairs of voltage detection portions, the fluctuation of the potential due to the path of the current after the voltage is taken out of the shunt resistor 1 can be suppressed.

In one embodiment, the shunt resistor 1 is formed by applying shape processing by means of a die or wire cutting to a long joint material consisting of a plate shaped resistive element and a plurality of copper plates joined at both ends of the above resistive element. In one embodiment, the slits 12, 13 are formed by punching out the shunt resistor 1 with a die or by applying the shape processing with the wire cutting. Furthermore, in one embodiment, a TCR characteristic function can be controlled by adjusting the shapes of the slits 12, 13.

Figure 5:
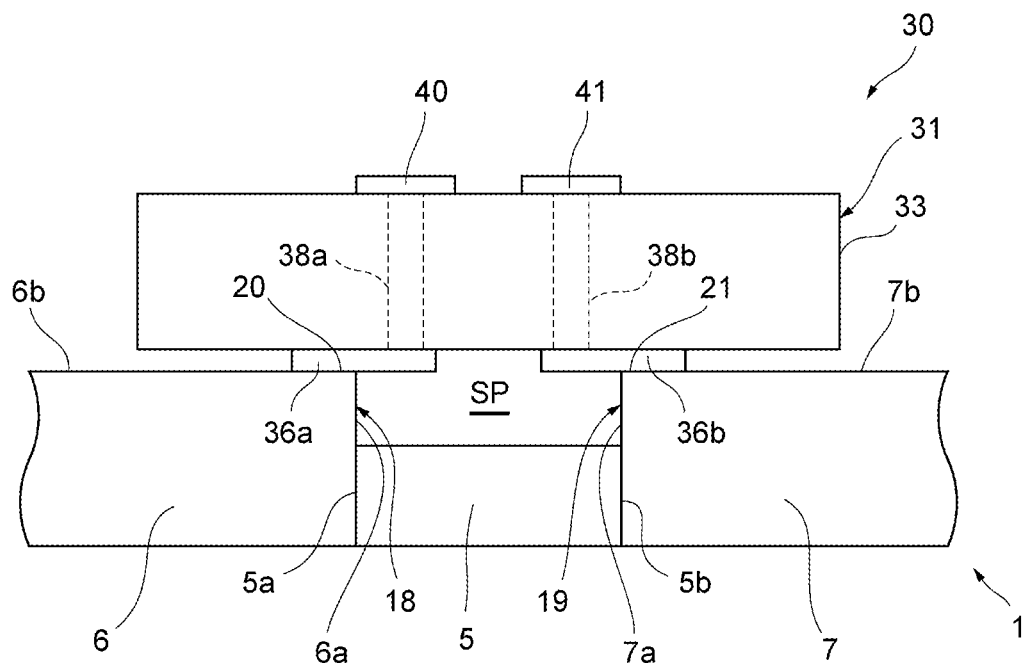
FIG. 5 is a schematic view showing another embodiment of the current detection device.

FIG. 5 is a schematic view showing another embodiment of the current detection device 30. In FIG. 5, a portion of the current detection device 30 is omitted. Configurations of this embodiment, which are not specifically described, is the same as that of the embodiments described with reference to FIGS. 1 through 4, so its redundant description is omitted. As shown in FIG. 5, the current detection device 30 of this embodiment has the shunt resistor 1 and a wiring board 31. The wiring board 31 includes detection members 36a, 36b. Wirings 40, 41 for transmitting a voltage signal (voltage of the resistor 5) from the shunt resistor 1 are formed on a surface of a board body 33 of the wiring board 31. The detection members 36a, 36b are connected to the wirings 40, 41 through via holes 38a, 38b.

The detection members 36a, 36b are connected to the voltage detection portions 20, 21, respectively. An example of the detection members 36a, 36b is a metal pad formed by patterning copper foil. The detection members 36a, 36b are connected to the voltage detection portions 20, 21 across the steps 18, 19 (so as to cover the contact surfaces 6a, 7a). The connection between the voltage detection portions 20, 21 and the wirings 40, 41 of the wiring board 31 may be made using a metal lead frame (plate-shaped conductive material) or a wire instead of the detection members 36a, 36b.

As described above, the shunt resistor 1 of this embodiment has the steps 18, 19, and the detection areas 24a, 24b, 25a, and 25b protrude from the resistive element 5 in the thickness direction of the shunt resistor 1. This allows the detection members 36a, 36b to be arranged across the steps 18, 19. This configuration allows the voltage detection position to be closer to the resistive element 5. As a result, the voltage of the resistive element 5 can be measured more precisely. In addition, the steps 18, 19 can prevent the detection members 36a, 36b from contacting the resistive element 5.

As described above, the resistive element 5 is connected to the electrodes 6, 7 by welding or other means. Therefore, the junction between the resistive element 5 and the electrodes 6, 7 is uneven due to weld marks, but in this embodiment, the shunt resistor 1 has the steps 18, 19, so the detection members 36a, 36b can be connected across the steps 18, 19 without being affected by the above weld marks. In addition, since the space SP is formed above the resistive element 5, the heat generated by the resistive element 5 can be avoided from being directly transferred to the wiring board 31.

Figure 6:
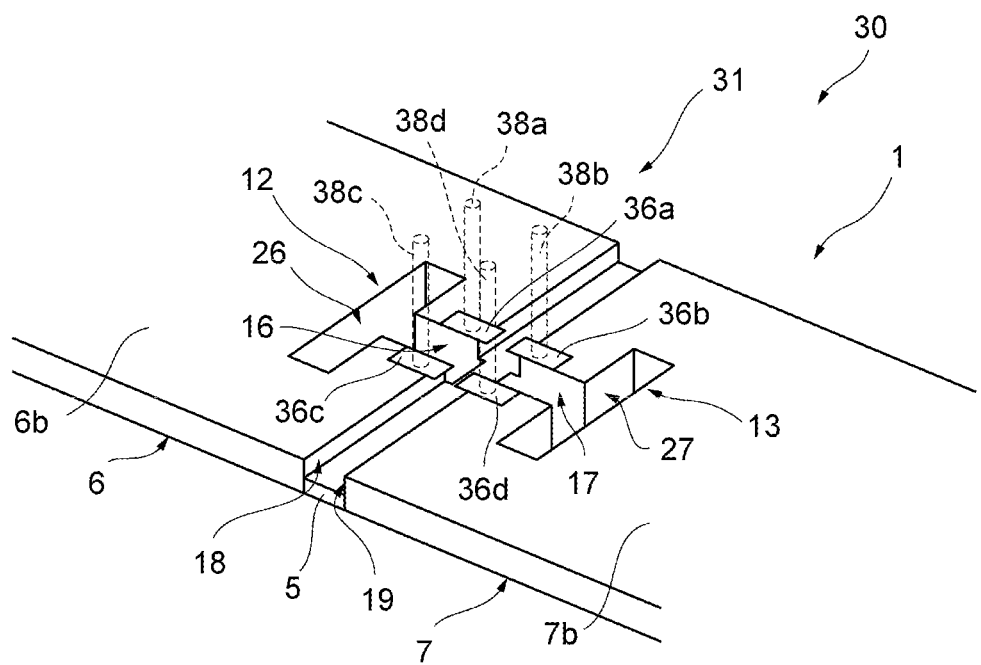
FIG. 6 is a schematic view showing another embodiment of the current detection device.

In one embodiment, as shown in FIG. 6, the wiring board 31 may include four detection members 36a, 36b, 36c, and 36d connected to the voltage detection portions 20, 21, 22, and 23 (see FIG. 4), respectively. The four detection members 36a, 36b, 36c, and 36d are connected to via holes 38a, 38b, 38c, and 38d, respectively, which are connected to wiring not shown. In FIG. 6, the board body 33 is omitted. In this embodiment, the detection members 36a, 36b, 36c, and 36d are also arranged across the steps 18, 19.

Figure 7:
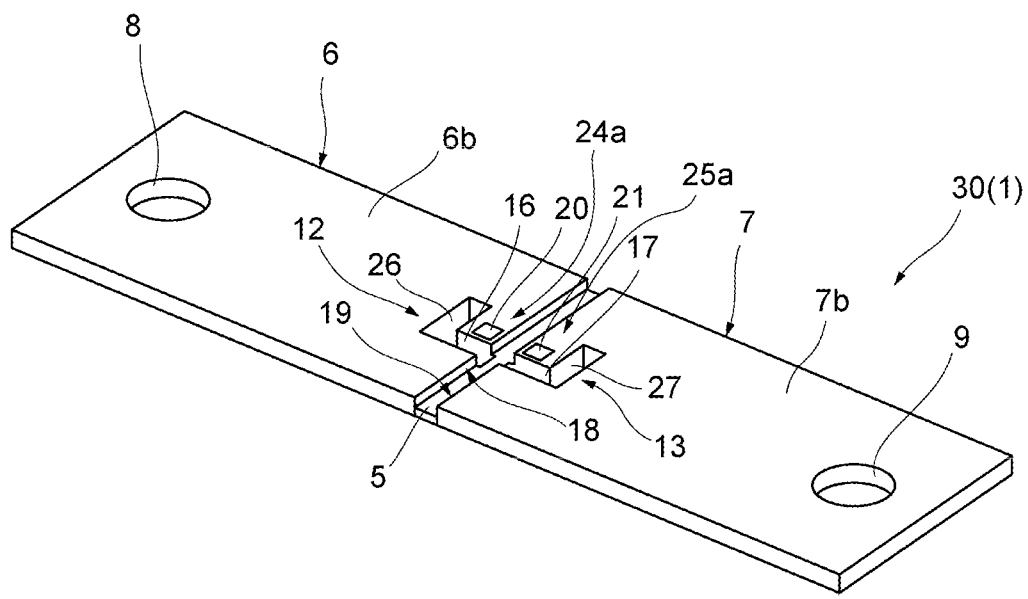
FIG. 7 is a schematic view showing another embodiment of the current detection device.

FIG. 7 is a view showing yet another embodiment of the current detection device 30. The configuration of this embodiment, which is not described in particular, is the same as the embodiment described with reference to FIGS. 1 through 4, so its redundant description is omitted. In this embodiment, one end of the first slits 16, 17 is connected to one end of the second slits 26, 27, respectively. In other words, the slits 12, 13 have an L-shaped shape when the shunt resistor 1 is viewed from above.

The electrode 6 has the detection area 24a demarcated by the first slit 16, the second slit 26, and the contact surface 6a, and the electrode 7 has the detection area 25a demarcated by the first slit 17, the second slit 27, and the contact surface 7a. The effects described with reference to FIGS. 1 through 4 can be achieved in this embodiment, and the embodiments described with reference to FIGS. 5 and 6 can also be applied to this embodiment.

Figure 8:
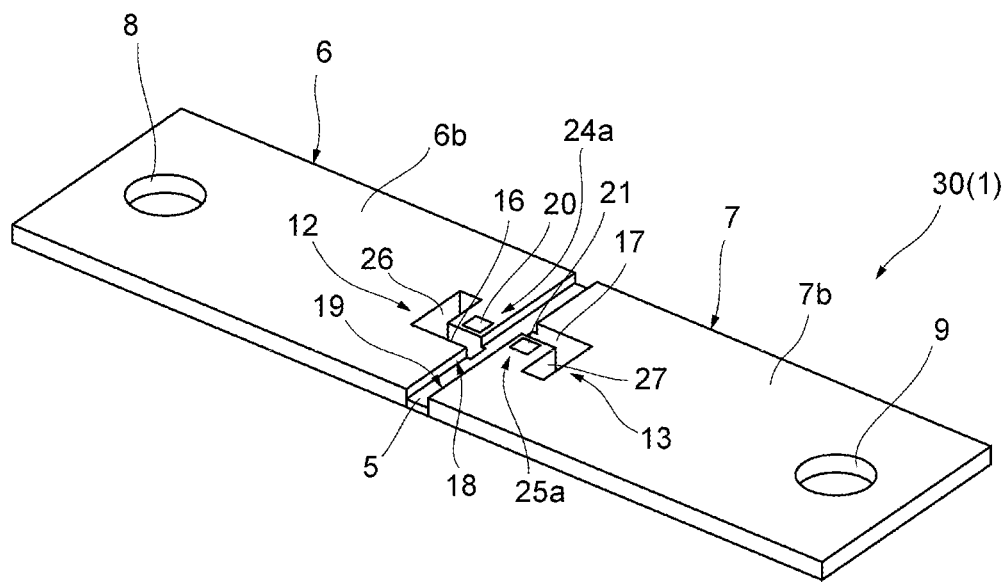
FIG. 8 is a schematic view showing another embodiment of the current detection device.

FIG. 8 is a view showing yet another embodiment of the current detection device 30. The configuration of this embodiment, which is not described in particular, is the same as that of the embodiment described with reference to FIG. 7, so its redundant description is omitted. In this embodiment, a position of the first slit 16 in the second direction and a position of the first slit 17 in the second direction are different, and the second slits 26, 27 extend in opposite directions. In other words, orientations of the L-shaped shape of the slits 12, 13 are reversed in the vertical direction and the horizontal direction when the shunt resistor 1 is viewed from above. The effects described with reference to FIGS. 1 through 4 can also be achieved in this embodiment, and the embodiments described with reference to FIGS. 5 and 6 can also be applied to this embodiment.

Figure 9:
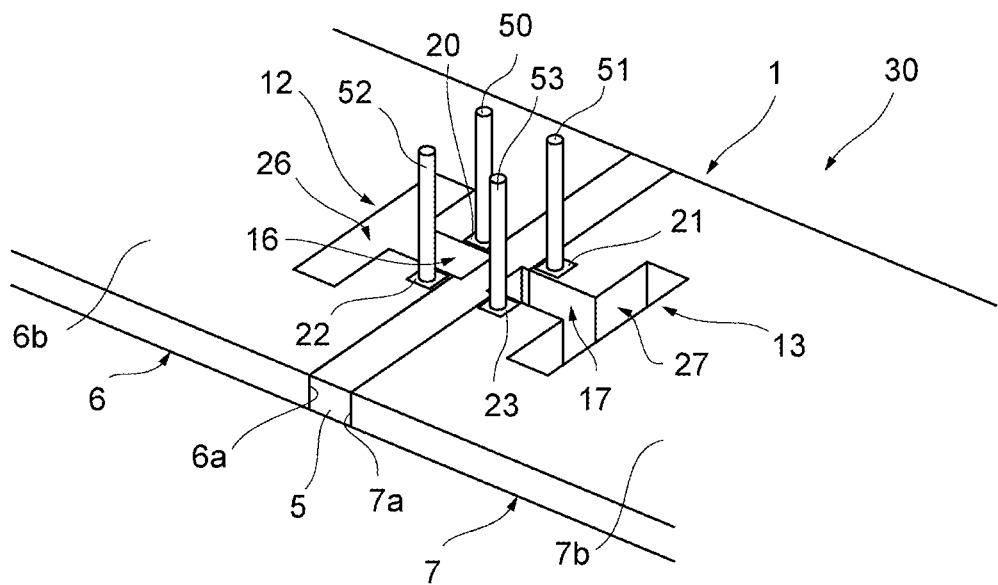
FIG. 9 is a schematic view showing another embodiment of the current detection device.

FIG. 9 is a view showing yet another embodiment of the current detection device 30. In FIG. 9, a portion of the current detection device 30 is omitted. The configuration of this embodiment, which is not described in particular, is the same as that of the embodiment described with reference to FIG. 4, so its redundant description is omitted. The current detection device 30 of this embodiment includes the shunt resistor 1 and voltage detection terminals 50, 51, 52, and 53. The shunt resistor 1 of this embodiment differs from the shunt resistor 1 of FIG. 4 in that it does not have the steps 18, 19. In other words, the thicknesses of the electrodes 6 and 7 and the resistive element 5 are the same in this embodiment.

The voltage detection terminals 50, 51, 52, and 53 are provided on the voltage detection portions 20, 21, 22, and 23, respectively. An example of each of the voltage detection terminals 50, 51, 52, and 53 is a pin terminal. The effects described with reference to FIGS. 1 through 4 can be achieved in this embodiment, and the embodiments described with reference to FIGS. 7 and 8 can also be applied to this embodiment.

Figure 10:
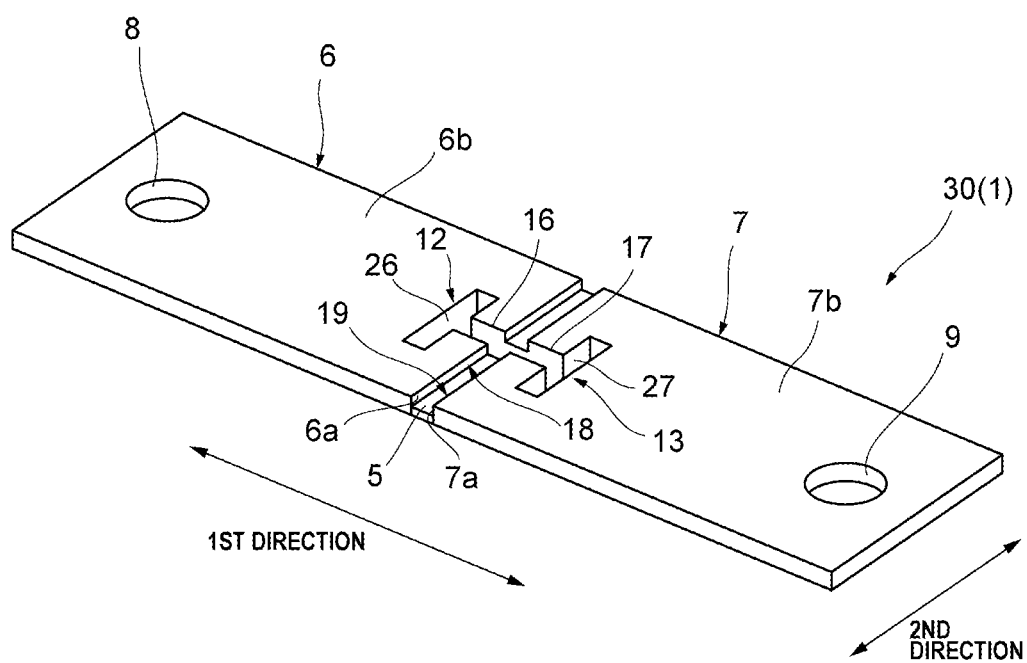
FIG. 10 is a perspective view showing yet another embodiment of the current detection device.
Figure 11:
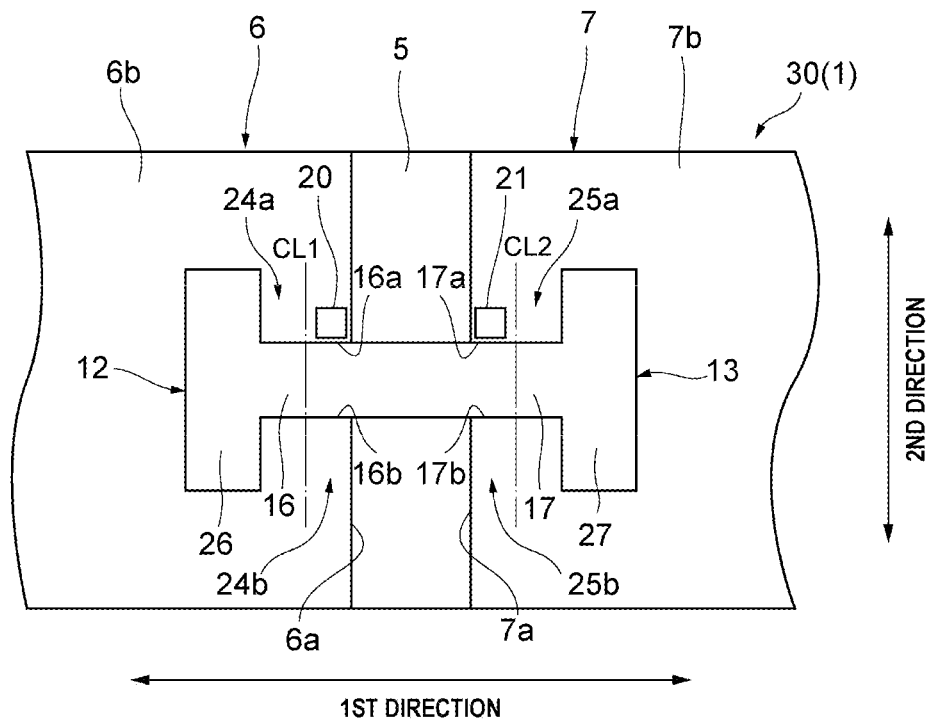
FIG. 11 is a partially enlarged view of the current detection device.

FIG. 10 is a view showing yet another embodiment of the current detection device 30, and FIG. 11 is a partially enlarged view of the current detection device 30. FIG. 11 is a top view of the current detection device 30. The configuration of this embodiment, which is not explained in particular, is the same as that of the embodiment described with reference to FIGS. 1 through 3, so its redundant explanation is omitted. In FIGS. 10 and 11, a portion of the current detection device 30 is omitted.

In this embodiment, the first slit 16 and the first slit 17 are connected. In other words, the first slit 16 and the first slit 17 are connected to each other. In other words, it can also be said that the first slit 16 is formed from the electrode 6 to the electrode 7, and the second slits 26, 27 are connected to both ends of the first slit 16. It can also be said that the first slit 17 is formed from the electrode 7 to the electrode 6, and the second slits 26, 27 are connected to both ends of the first slit 17.

Figure 12:
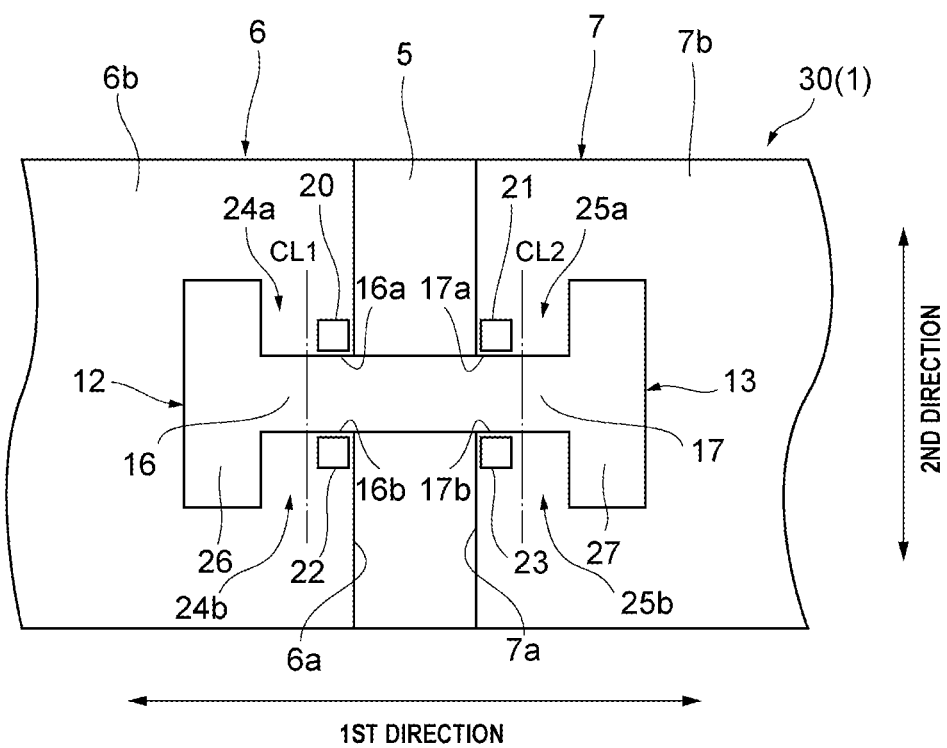
FIG. 12 is a schematic view showing yet another embodiment of the current detection device.
Figure 13:
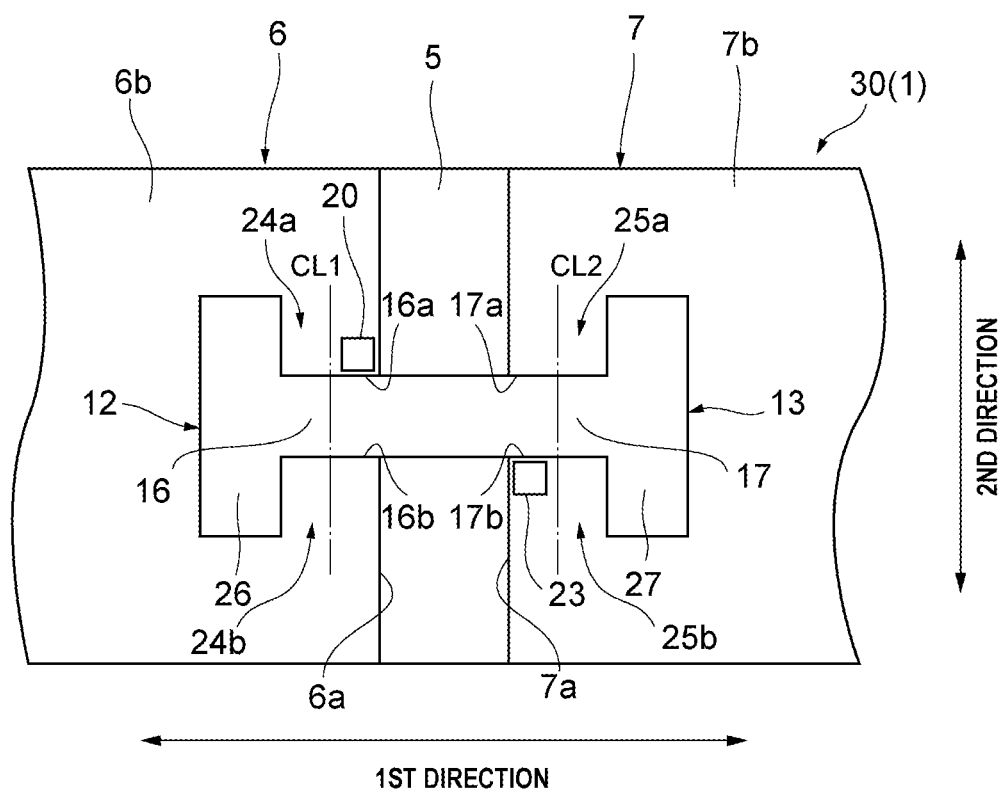
FIG. 13 is a schematic view showing yet another embodiment of the current detection device.

In one embodiment, as shown in FIG. 12, the electrode 6 may have an additional voltage detection portion 22 arranged on the detection area 24b, and the electrode 7 may have an additional voltage detection portion 23 arranged on the detection area 25b. In this embodiment, voltage is detected from two pairs of voltage detection portions. In one further embodiment, as shown in FIG. 13, the electrode 6 may have a voltage detection portion 20 arranged on the detection area 24a, and the electrode 7 may have the voltage detection portion 23 arranged on the detection area 25b. In this embodiment, the voltage of the resistive element 5 is measured on a diagonal line across the first slits 16 and 17.

The embodiments described with reference to FIGS. 10 through 13 can also achieve the same effects as those described above with reference to FIGS. 1 through 4. The embodiments described with reference to FIGS. 5 and 6 and the voltage detection terminals 50, 51, 52, and 53 described with reference to FIG. 9 can be applied to the embodiments described with reference to FIGS. 10 through 13.

The above embodiments are described for the purpose of practicing the present invention by a person with ordinary skill in the art to which the invention pertains. Although preferred embodiments have been described in detail above, it should be understood that the present invention is not limited to the illustrated embodiments, but many changes and modifications can be made therein without departing from the appended claims.

INDUSTRIAL APPLICABILITY

The present invention is applicable to a current detection device, especially a current detection device using a shunt resistor.

1 shunt resistor
5 resistive element
5a,5b both ends (both side connection surfaces)
5c surface
6,7 electrode
6a, 7a contact surface
6b,7b surface
8,9 fastening hole
12,13 slit
16,17 first slit
16a, 16b,17a,17b side wall
18,19 step
20,21,22,23 voltage detection portion
24a,24b,25a,25b detection area
26,27 second slit
30 current detection device
31 wiring board
33 board body
36a,36b,36c,36d detection member
38a,38b,38c,38d via hole
40,41 wiring
50,51,52,53 voltage detection terminal

The invention claimed is:

1. A current detection device used for current detecting, comprising:
   a resistive element; and
   a pair of electrodes connected to both ends of the resistive element,
   wherein the current detection device has a pair of first slits and a pair of second slits connected to the pair of the first slits,
   wherein each of the first slits is formed to create an opening in each of the electrodes and the resistive element along a first direction, which is a direction perpendicular to the direction along which the junction of the resistive element and the electrodes runs,
   wherein each of the second slits is formed to create an opening in each of the electrodes along a second direction, which is a direction parallel to the direction along which the junction of the resistive element and the electrodes runs, wherein each of the electrodes has a detection area demarcated by each of the first slits, each of the second slits, and a contact surface that at least partially contacts the resistive element, and wherein each of the electrodes further has a voltage detection portion arranged in the detection area, wherein each of the pair of first slits extend toward each other to enter the resistive element and is terminated in the resistive element such that the resistive element is interposed between the pair of first slits.

2. The current detection device according to claim 1, wherein the voltage detection portion is arranged closer to the resistive element than a center of the detection area.

3. The current detection device according to claim 1, wherein the detection area protrudes from the resistive element in a thickness direction of the current detection device.

4. The current detection device according to claim 1, wherein the voltage detection portion is arranged adjacent to the contact surface and each of the first slits.

5. The current detection device according to claim 1, further comprising a wiring board, wherein the wiring board comprises a detection member connected to the voltage detection portion.

6. The current detection device according to claim 1, wherein the pair of the first slits is connected.

7. A current detection device used for current detecting, comprising:

a resistive element; and a pair of electrodes connected to both ends of the resistive element, wherein the current detection device has a pair of first slits and a pair of second slits connected to the pair of the first slits, wherein each of the first slits is formed to create an opening in each of the electrodes and the resistive element along a first direction, which is a direction perpendicular to the direction along which the junction of the resistive element and the electrodes runs, wherein each of the second slits is formed to create an opening in each of the electrodes along a second direction, which is a direction parallel to the direction along which the junction of the resistive element and the electrodes runs, wherein each of the electrodes has a detection area demarcated by each of the first slits, each of the second slits, and a contact surface that at least partially contacts the resistive element, and wherein each of the electrodes further has a voltage detection portion arranged in the detection area, wherein the pair of the first slits is connected.

* * * * *